(12) United States Patent
Ogihara et al.

(10) Patent No.: US 7,769,946 B2
(45) Date of Patent: Aug. 3, 2010

(54) INFORMATION PROCESSING APPARATUS AND INFORMATION PROCESSING METHOD

(75) Inventors: Yuuji Ogihara, Chiba (JP); Shigetaka Kudou, Tokyo (JP); Takeshi Iwatsu, Saitama (JP); Takashi Goto, Chiba (JP)

(73) Assignee: Sony Corporation, Tokyo (JP)

( * ) Notice: Subject to any disclaimer, the term of this patent is extended or adjusted under 35 U.S.C. 154(b) by 2092 days.

(21) Appl. No.: 10/656,207

(22) Filed: Sep. 8, 2003

(65) Prior Publication Data
US 2004/0117547 A1   Jun. 17, 2004

(30) Foreign Application Priority Data
Sep. 10, 2002   (JP) ............................. 2002-264306

(51) Int. Cl.
*G06F 12/00* (2006.01)

(52) U.S. Cl. ............... 711/112; 711/154; 711/E12.002

(58) Field of Classification Search ................... 711/112
See application file for complete search history.

(56) References Cited

U.S. PATENT DOCUMENTS

| 5,463,772 | A | * | 10/1995 | Thompson et al. | ................... 1/1 |
| 5,680,482 | A | * | 10/1997 | Liu et al. | ..................... 382/233 |
| 5,991,777 | A | * | 11/1999 | Momoh et al. | .............. 707/205 |
| 2002/0166056 | A1 | * | 11/2002 | Johnson et al. | ............. 713/193 |
| 2004/0199654 | A1 | * | 10/2004 | Juszkiewicz | ................ 709/231 |

* cited by examiner

*Primary Examiner*—Reginald G Bragdon
*Assistant Examiner*—Larry T Mackall
(74) *Attorney, Agent, or Firm*—Oblon, Spivak, McClelland, Maier & Neustadt, L.L.P.

(57) ABSTRACT

The present invention provides application software with a function of allowing reproduction of an audio-only disk-shaped recording medium by a similar command to that for reproduction of a disk-shaped recording medium for computer data. The function is interposed between a computer controlling operating system and application software.

17 Claims, 9 Drawing Sheets

F I G. 2
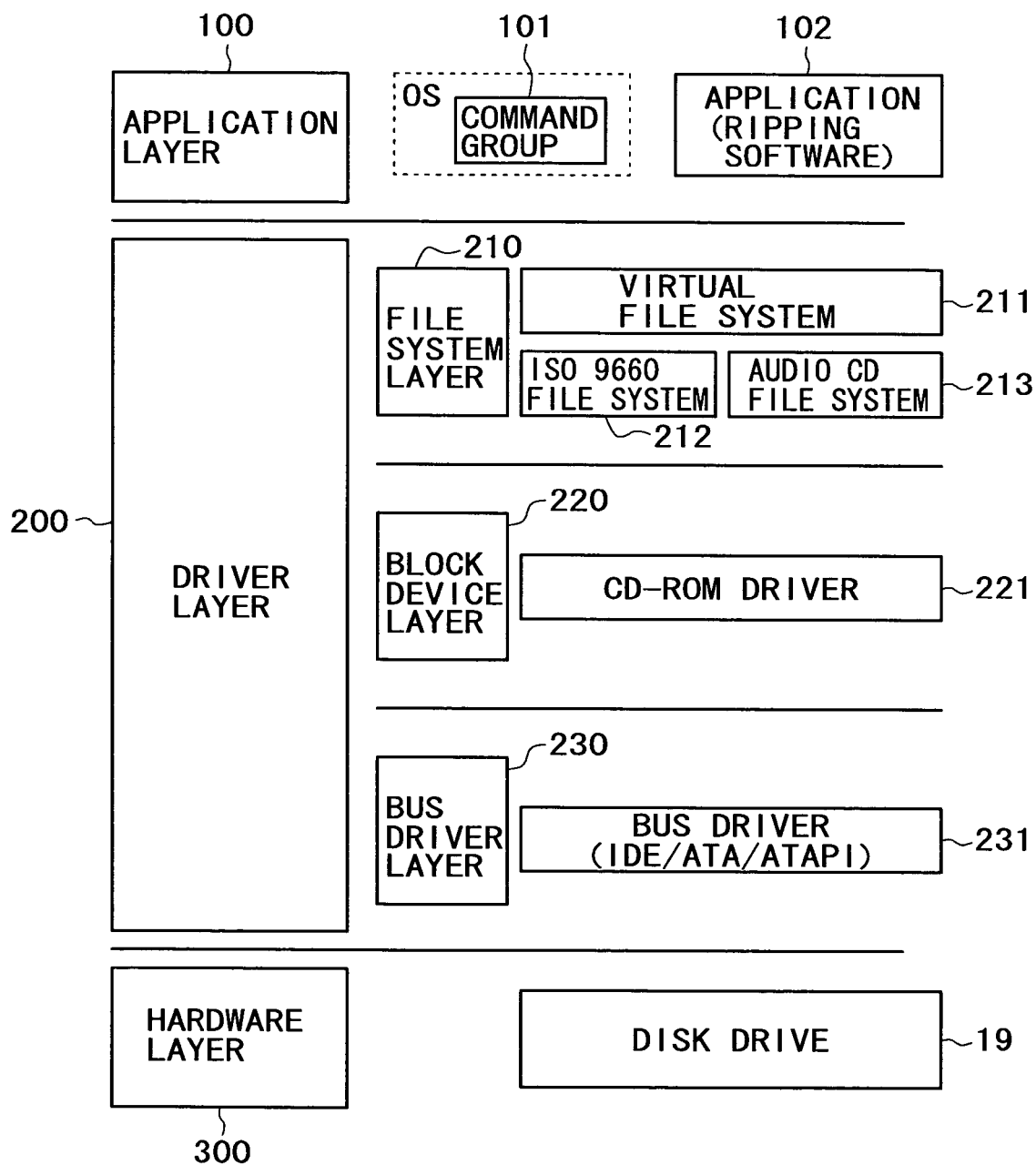

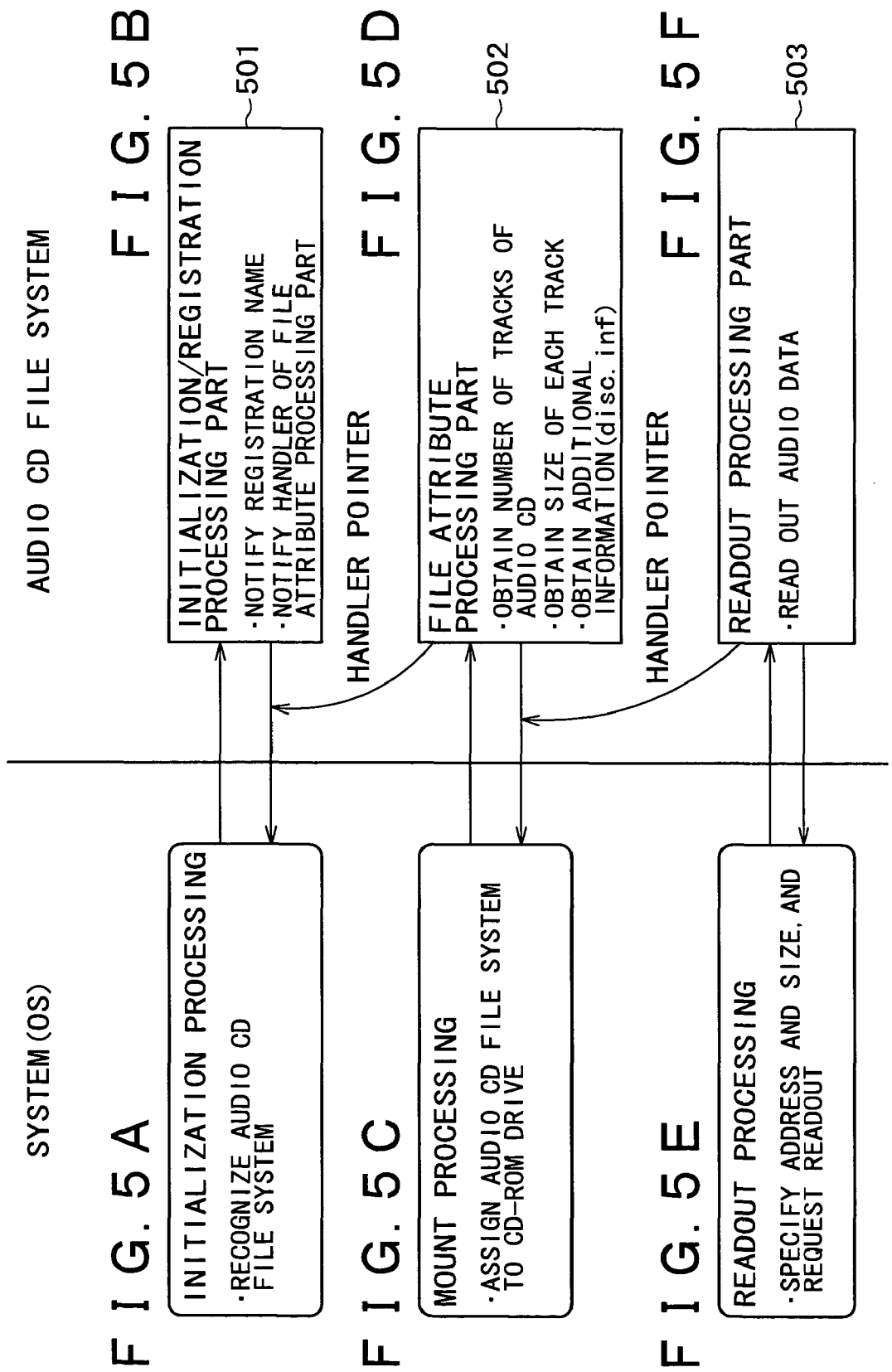

FIG. 6

```
#ls -al /mnt
dr-xr-xr-x   1 root root      2912 Apr 19 00:03 .
drwxr-xr-x  17 root root      1024 Apr 19 2002  ..
-r--r--r--   1 root root       804 Apr 19 00:03 disc.inf          ← DISK/TRACK INFORMATION FILE
-r--r--r--   1 root root       xxx Apr 19 00:03 cd_text.inf       ← CD-TEXT INFORMATION FILE
-r--r--r--   1 root root 324469360 Apr 19 00:03 track01.cda  ⎫
-r--r--r--   1 root root  44076480 Apr 19 00:03 track02.cda  ⎪
-r--r--r--   1 root root  36122016 Apr 19 00:03 track03.cda  ⎪
-r--r--r--   1 root root  47632704 Apr 19 00:03 track04.cda  ⎪
-r--r--r--   1 root root  49568400 Apr 19 00:03 track05.cda  ⎪
-r--r--r--   1 root root  46734240 Apr 19 00:03 track06.cda  ⎪
-r--r--r--   1 root root 604346400 Apr 19 00:03 track07.cda  ⎬ AUDIO DATA FILES
-r--r--r--   1 root root  58513056 Apr 19 00:03 track08.cda  ⎪
-r--r--r--   1 root root  39624144 Apr 19 00:03 track09.cda  ⎪
-r--r--r--   1 root root  30493680 Apr 19 00:03 track10.cda  ⎪
-r--r--r--   1 root root  51010176 Apr 19 00:03 track11.cda  ⎪
-r--r--r--   1 root root  54900384 Apr 19 00:03 track12.cda  ⎪
-r--r--r--   1 root root  46118016 Apr 19 00:03 track13.cda  ⎪
-r--r--r--   1 root root  31634400 Apr 19 00:03 track14.cda  ⎭
```

F I G. 7

| disc. inf || |
|---|---|---|
| DISK INFOR- MATION | ftno (FIRST TRACK NUMBER) ||
| | ltno (LAST TRACK NUMBER) ||
| TRACK INFOR- MATION | track 01 | emp (INDICATING WHETHER EMPHASIS PROCESSING HAS BEEN PERFORMED) |
| | | data (INDICATING WHETHER THE DISK IS AUDIO CD) |
| | | nocopyright<br>・INDICATING COPYRIGHT INFORMATION<br>・INDICATING WHETHER COPYING IS ALLOWED<br>・INDICATING WHETHER THE DISK IS CD-R AUDIO |
| | | audio_ch (INDICATING NUMBER OF AUDIO CHANNELS) |
| | track 14 | emp |
| | | data |
| | | nocopyright |
| | | audio_ch |

INFORMATION PROCESSING APPARATUS AND INFORMATION PROCESSING METHOD

BACKGROUND OF THE INVENTION

The present invention relates to a method of transmitting a command to reproduce an audio-only disk-shaped recording medium to a device driver on the basis of a request from application software.

As is well known, in a computer system, data and information on attributes of the data are handled in a unit of a file and stored in a device such as an Hard Disk Drive (HDD) or the like. The file is managed by a so-called file system. The file system implemented provides a correspondence between a physical recording position of the data and attribute information actually stored in the device such as the HDD or the like and file manipulation from application software, for example.

Consequently data manipulation such as reading data from the HDD, writing data to the HDD, and deleting data from the HDD by the application software positioned at a higher level than the device, for example, is simplified.

That is, even when the application software does not know the physical recording position of the data and attribute information actually stored in the device, the application software properly performs data manipulation such as reading data from the HDD, writing data to the HDD, and the like by calling a command or a function provided in advance by the system side by a system call, for example, and outputting the command or the function to the file system. When certain application software is to read a specified file on the basis of a user operation, for example, a command to read data is issued by a system call, and in response to the command, control is effected on the device to read the specified file from the HDD.

The command called as described above, for example, is standardized to be a common command usable by various applications. It can therefore be said that an instruction for file manipulation by application software is converted to a unique instruction by a system call as mentioned above, for example. The system call for such file manipulation is enabled on a precondition that the file is managed by the file system in a layer lower than that of the application software.

Incidentally, as file system corresponding to the HDD, File Allocation Table (FAT) or the like is known.

Drives capable of reproducing CD-ROM have recently spread widely as a block device other than the HDD. Generally, a computer system having a CD-ROM drive as a device can install appropriate application software, middleware, and the like therein and thus reproduce a disk medium in a CD format. That is, the computer system can reproduce CD-DA (Digital Audio) in addition to CD-ROM. As is well known, CD-ROM is a disk medium, having data recorded thereon, for reproduction only. CD-DA is for audio data only and is a disk medium on which digital audio data in a format of a sampling frequency of 44.1 kHz and 16-bit quantization is recorded for reproduction only.

As a logical format of CD-ROM described above, ISO 9660 is defined. Under the format of ISO 9660, a file system for ISO 9660 is defined.

For example, for a CD-ROM in the ISO 9660 format, a file system generated on the basis of contents of a path table recorded on the CD-ROM is mounted, as is well known.

Also in this case, application software at a higher level can perform manipulation such as reading of data recorded on the CD-ROM and the like by a system call as mentioned above, for example, using the above file system for ISO 9660. That is, the application software can manipulate the data recorded on the CD-ROM through an Application Program Interface (API) similar to that for the HDD.

This eliminates the need for preparing, for each piece of application software, a program for direct file manipulation with the position of data recorded on the HDD or the CD-ROM taken into consideration. Therefore, design of application software for processing data recorded on the CD-ROM, for example, can be correspondingly simplified.

As described above, some disk drives capable of reproducing disk media in the CD format such as CD-ROM drives can read data not only from a CD-ROM but also from a CD-DA.

Application software operating on a CD-DR performs operation, for example, the software controls reproduction of the CD-DA, whereby audio data recorded on the CD-DA loaded in a CD-ROM drive is read to be, for example, reproduced and outputted or recorded on an HDD or the like.

In the present situation, however, the file system is provided for CD-ROM as described above, whereas no file system is provided for CD-DA.

For example the format of CD-ROM is originally defined on an assumption that CD-ROM records data to be processed by a computer system. Therefore file systems for CD-ROM including for example the above-described file system for ISO 9660 were implemented from the beginning.

On the other hand, CD-DA is originally based on an assumption that CD-DA is only reproduced by an audio apparatus such as a CD player or the like. Therefore, a file system for CD-DA has not been incorporated in a system such as an OS, for example, and no file system for CD-DA is implemented in the present situation either.

Thus no file system for CD-DA being implemented means that unlike the case of manipulation of data on a CD-ROM, it is not possible to effect control by a unique command using a system call provided by the computer system.

Hence, a program of application software for realizing some function aimed at CD-DA, for example, is created on this assumption.

That is, the program is created such that the application software can directly control a device for CD-ROM or the like and perform manipulation such as reading of data from a CD-DA and the like. For example, the application software is configured to issue commands that can directly control the device. Thus, the creation and design of a program of application software operating on CD-DA is correspondingly more difficult.

SUMMARY OF THE INVENTION

It is an object of the present invention to provide an information processing apparatus for reproducing an audio-only disk-shaped recording medium. The apparatus includes reproducing means for at least reproducing an audio data signal from the audio-only disk-shaped recording medium, storing means for storing data, and controlling means for controlling reproduction of audio data from the audio-only disk-shaped recording medium on the basis of control information stored in the storing means. The controlling means controls the reproduction of the audio data on the basis of system controlling software stored in the storing means. The system controlling software includes an application layer for converting a request from application software into a predetermined command and outputting the command, and a driver layer having a file system layer including an audio-only file system for generating a control command to be outputted to a device driver in a device layer at least for the reproducing means to read the audio data from the audio-only disk-shaped recording medium to control a device corresponding to the command on the basis of the command inputted from the application layer.

It is another object of the present invention to provide an information processing method for reading an audio signal from an audio-only disk-shaped recording medium by a reproducing device and reproducing the audio signal. The method includes a step for converting a request from application software into a predetermined command in a file system layer and outputting the command, and a processing step corresponding to an audio-only file system for generating a control command to be outputted to a device driver in a device layer at least for the reproducing device to read audio data from the audio-only disk-shaped recording medium to control a device corresponding to the command on the basis of the command converted by the conversion and inputted.

BRIEF DESCRIPTION OF THE DRAWINGS

These and other objects of the invention will be seen by reference to the description, taken in connection with the accompanying drawing, in which:

FIG. 2 is a diagram of assistance in explaining a system hierarchy according to the present embodiment;

FIGS. 5A, 5B, 5C, 5D, 5E, and 5F are diagrams of assistance in explaining a configuration of the audio CD file system by relations with a system (OS) in terms of processing operations;

FIG. 6 is a file configuration diagram showing an example of files created by the audio CD file system;

FIG. 7 is a structural diagram showing an example of a structure of a disk/track information file (disc.inf) created by the audio CD file system;

DETAILED DESCRIPTION OF THE PREFERRED EMBODIMENT

A preferred embodiment of the present invention will hereinafter be described. A recording and reproducing apparatus as an AV apparatus configured to record and reproduce audio data and the like on the basis of a computer system will be taken as an example of the present embodiment.

Figure 1:
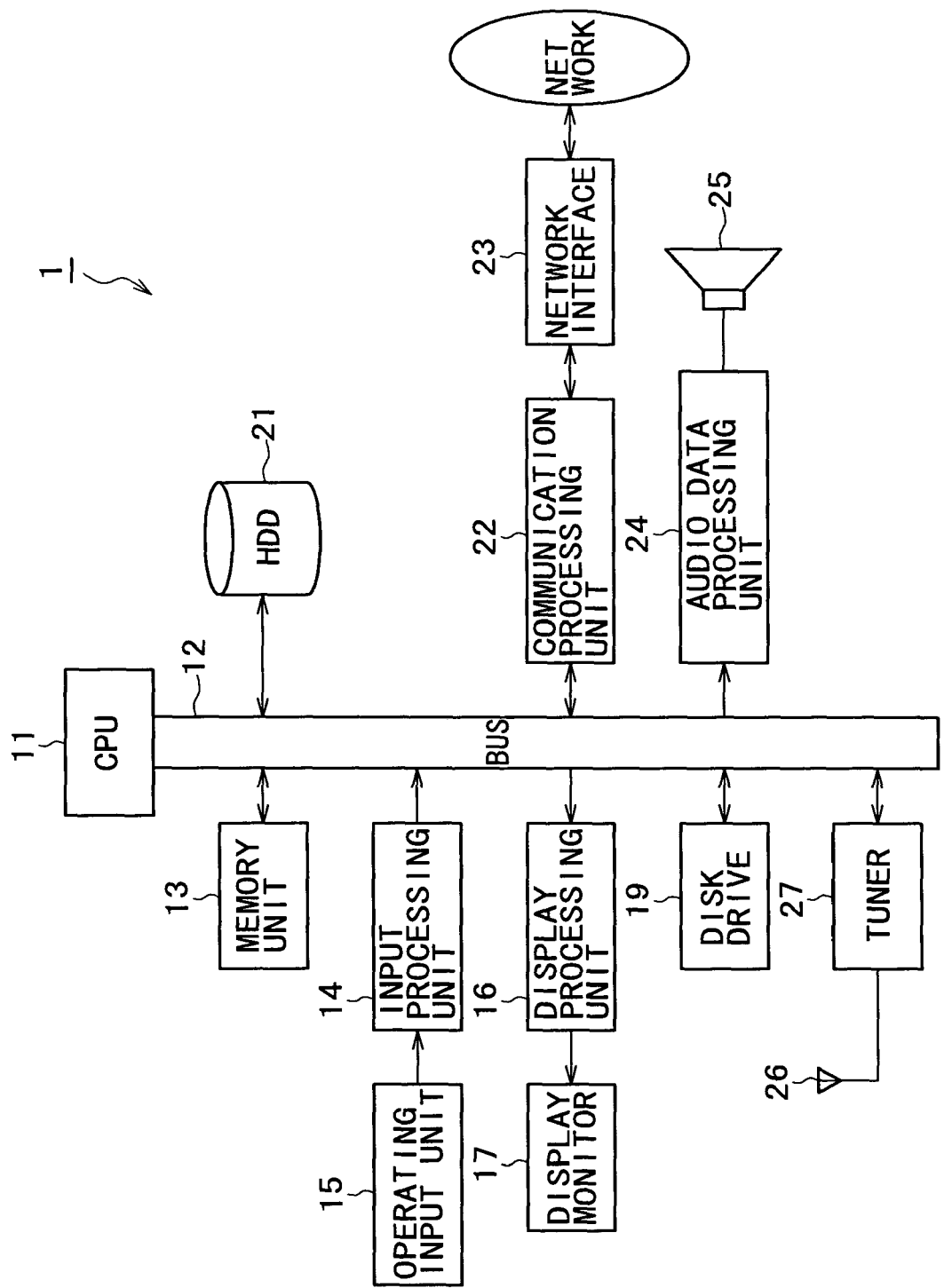
FIG. 1 is a block diagram showing an example of configuration of a recording and reproducing apparatus as an information processing apparatus according to an embodiment of the present invention.

FIG. 1 is a block diagram showing an example of configuration of a recording and reproducing apparatus 1 according to the present embodiment.

A Central Processing Unit (CPU) 11 controls the whole of the recording and reproducing apparatus 1 and performs calculation processing on the basis of a started program. The CPU 11 for example performs communication operation via a network, input-output operation for a user, reproduction and ripping of CD, storing of a content in an HDD 21 and management therefor, and the like.

The CPU 11 exchanges control signals and data with each circuit unit via a bus 12.

A memory unit 13 includes a RAM, a ROM, a flash memory (nonvolatile memory), and the like used by the CPU 11 for processing.

The ROM in the memory unit 13 stores operation programs to be executed by the CPU 11, a program loader, and the like. The flash memory in the memory unit 13 stores various calculation coefficients, parameters used in a program, and the like. The RAM in the memory unit 13 temporarily provides a data area and a task area for executing a program.

An operating input unit 15 is a part including various operators and the like such as operating keys, a jog dial, a touch panel, and the like provided to a casing of the recording and reproducing apparatus 1. Incidentally, a keyboard and a mouse for Graphical User Interface (GUI) operation may be provided as the operating input unit 15.

Information inputted by the operating input unit 15 is subjected to predetermined processing at an input processing unit 14 and then transmitted to the CPU 11 as operating information. The CPU 11 performs required calculation and control to provide an operation of the apparatus in response to the inputted operating information.

As a display monitor 17, a display device such for example as a liquid crystal display is connected to display various information.

When the CPU 11 supplies a display processing unit 16 with display information in accordance with various operation states, input states, and communication states, the display processing unit 16 makes the display monitor 17 perform display operation on the basis of the supplied display data.

In the case of the present embodiment, for example, the display monitor 17 displays a GUI screen for managing and reproducing an audio file according to a program of a ripping application as application software for reproducing and managing ripped audio files.

A disk drive 19 in this case is a so-called CD-ROM drive. The disk drive 19 has an optical head, a spindle motor, a reproduced signal processing unit, a servo circuit, and the like. The disk drive 19 can read data from a disk medium conforming to a CD format. That is, the disk drive 19 can read data from a CD-ROM, a CD-DA, and the like.

As is well known, the CD-ROM is a reproduction-only disk medium where data to be processed by information processing is recorded as a file. The CD-DA is for audio data only and is a reproduction-only disk medium where audio data in a format of a sampling frequency of 44.1 kHz and 16-bit quantization is recorded.

Also, CD-Rs, CD-RWs, and the like have recently spread as recordable CDs. The disk drive 19 can read data from CD-Rs and CD-RWs on which data is recorded in a CD-ROM or CD-DA format.

When a user performs an operation for disk reproduction from the input unit 15, the CPU 11 instructs the disk drive 19 to reproduce the disk via the bus 12. In response to the instruction, the disk drive 19 accesses a specified disk position to read data, performs decode processing corresponding to recording encode modulation, for example, and then sends the result as reproduced data to the bus 12.

When the reproduced data is audio data read from a CD-DA, for example, the audio data is subjected to sound field processing such for example as equalizing, sound volume adjustment, D/A conversion, amplification, and the like at an audio data processing unit 24. Then, the audio data is outputted from a speaker unit 25.

The data reproduced by the disk drive 19 can also be subjected to required file encode processing by the CPU 11 and then stored in the HDD 21 as an audio data file. That is, an audio data file obtained by so-called ripping can be stored.

Incidentally, the audio data file may be digital audio data of a sampling frequency of 44.1 kHz and 16-bit quantization in the CD format or compressed audio data in a format after being subjected to compression processing by a predetermined system to save space of the HDD 21. Compression systems that can be adopted include but not limited to an Adaptive Transform Acoustic Coding (ATRAC) system, an MPEG Audio Layer III (MP3) system and the like.

A tuner unit 27 is an AM-FM radio tuner, for example. The tuner unit 27 demodulates a broadcast signal received by an antenna 26 under control of the CPU 11. The tuner may of course be a television tuner, a satellite broadcasting tuner, a digital broadcasting tuner, or the like.

The broadcast audio signal demodulated is subjected to required processing at the audio data processing unit 24 and then outputted as broadcast audio from the speaker unit 25.

A communication processing unit 22 encodes transmitting data and decodes received data under control of the CPU 11.

A network interface 23 transmits the transmitting data encoded by the communication processing unit 22 to a predetermined external network-ready apparatus via a network. Also, the network interface 23 sends a signal transmitted from an external network-ready apparatus via the network to the communication processing unit 22.

The communication processing unit 22 transfers the received information to the CPU 11.

It is to be noted that the configuration of the recording and reproducing apparatus 1 is not limited to the configuration of FIG. 1, and various other configurations are conceivable.

For example, the recording and reproducing apparatus 1 may be provided with a Digital Versatile Disc (DVD) drive, a Mini Disc (MD) drive, a tape drive, and the like to support various recording media and may be provided with an interface with a peripheral device by a communication system such for example as Universal Serial Bus (USB), IEEE 1394, and Bluetooth.

The recording and reproducing apparatus 1 may also be provided with terminals for connection of a microphone and external headphones, a video output terminal for DVD reproduction, a line connection terminal, an optical digital connection terminal, and the like.

The recording and reproducing apparatus 1 may further have a PCMCIA slot, a memory card slot, and the like formed therein to exchange data with external information processing apparatus and audio apparatuses.

The recording and reproducing apparatus 1 configured as described above is based on the configuration of a computer system. Specifically, as described above, the CPU 11 performs processing according to a program stored in the ROM in the memory unit 13. The program stored in the ROM includes for example an Operation System (OS), middleware operating on the OS for implementing various functions of the recording and reproducing apparatus 1 as the present embodiment, and application software. For such a configuration, devices such for example as the disk drive 19 and the HDD 21 are provided.

The general configuration of the recording and reproducing apparatus 1 according to the present embodiment as a computer system will next be described with reference to a hierarchical model shown in FIG. 2.

In this case, an application layer 100 is positioned at a highest layer. A driver layer 200 is positioned at a level lower than the application layer 100. A file system layer 210, a block device layer 220, and a bus driver layer 230 are positioned from an upper level to a lower level of the driver layer 200.

As will be described later, the present embodiment is characterized in that there is an audio CD file system 213 provided for CD-DA in the file system layer 210. For convenience of description, in correspondence with the fact that the disk drive 19 for reproducing CD-DA is a block device, only the block device layer 220 is shown as a device-related layer.

A hardware layer 300 is positioned at a level lower than the driver layer 200.

First, FIG. 2 shows the application layer 100 in which a command group 101 including various commands included as system or OS standard and installed application software 102 are arranged.

The command group 101 includes various commands provided for a system call function provided by the system or the OS, for example. In performing a required operation involving device control, for example, various application software can call a required command from the command group 101 by a system call and output the command to the driver layer 200 at a lower level. The application software can thereby control the device, for example.

That is, the commands called by a system call from the command group 101 are for example to be shared between various pieces of application software and are to be said to standardize control on the driver layer 200 at the lower level. The control differs between various pieces of application software.

Incidentally, as related to the present embodiment, system call commands included in the command group 101 for example include a command cp for a file copy. Also, the application software 102 for example includes fopen/fread/fwrite with a file interface.

It is to be noted that for convenience of description, the application software 102 in FIG. 2 processes data recorded on a CD-DA. For example, the application software 102 in this case includes software having a function of a CD player for reproducing audio data read from a CD-DA by the disk drive 19, ripping software for ripping audio data read from a CD-DA and supplying the audio data to the HDD 21, and the like.

As described above, the application layer 100 has a function for issuing a command from the command group 101 according to a program as the application software 102, for example, and sending the command to the driver layer 200 in the lower layer.

Specifically, as described above, when the application software 102 in this case is to manipulate data on the medium, the application software 102 outputs a command called by making a so-called system call to the driver layer 200. Then, actual processing such as file reading and the like is performed by the layers from the driver layer 200 on down receiving the command by the system call.

Positioned between the application layer 100 and the hardware layer 300, the driver layer 200 has a function of controlling the device as hardware positioned in the hardware layer 300 in response to a request such as a command from the application layer 100 side or the like.

It is to be noted that while a general driver layer is treated as a layer where various device drivers function, the driver layer 200 shown in this case is limited to the driver layer corresponding to the disk drive 19 implemented in the recording and reproducing apparatus 1, for convenience of description.

The file system layer 210 is positioned in the highest layer of the driver layer 200. As shown in FIG. 2, the file system layer 210 has a virtual file system 211 positioned at an upper level. Functions of the virtual file system 211 will be described later. More than one file system is positioned under the virtual file system 211. That is, the common virtual file system 211 is positioned over a plurality of file systems and has a function of providing a common interface between the plurality of different file systems and the application layer 100.

As file systems positioned under the virtual file system 211, FIG. 2 shows file systems corresponding to the disk drive 19 as the CD-ROM drive.

Specifically, one of the file systems shown is an ISO 9660 file system 212. This file system exists conventionally and is implemented for CD-ROM in an ISO 9660 format.

Another file system shown, which characterizes the present embodiment, is an audio CD file system 213. As is understood from FIG. 2, the audio CD file system 213 according to the present embodiment is placed in the same layer as the conventionally existing ISO 9660 file system 212, for example.

A device driver capable of controlling a block device is positioned in the block device layer 220 positioned under the file system layer 210 in the driver layer 200. In this case, a CD-ROM driver 221 corresponding to the disk drive 19 is positioned as a device driver.

Further, a driver of the bus to which the block device is connected is positioned in the bus driver layer 230 positioned under the block device layer 220 in the driver layer 200. In this case, a bus driver 231 corresponding to the disk drive 19 is positioned in the bus driver layer 230.

The bus driver 231 in this case conforms to the IDE/ATA standard, for example, and issues packets according to an ATAPI format in practice. That is, the bus driver layer 230 has a function of a packet interface between the hardware layer 300 and the layers higher than the bus driver layer 230.

A block device as real hardware is positioned in the hardware layer 300 positioned under the driver layer 200 of the above-described structure. In this case, the disk drive 19 as CD-ROM drive shown in FIG. 1 is shown in the hardware layer 300.

As shown in FIG. 2, in the present embodiment, the conventionally nonexistent audio CD file system 213 is implemented in the same layer as the ISO 9660 file system 212 corresponding to CD-ROM, that is, in the file system layer 210 in the system hierarchy. As will be described later, as with the ISO 9660 file system 212, the audio CD file system 213 can control the disk drive 19 as CD-ROM drive.

Functions of the virtual file system 211 shown in the system hierarchy of FIG. 2 will be described by taking as an example a relation with the audio CD file system 213 with reference to FIG. 3.

For the virtual file system 211 to perform the functions, file systems need to be registered with the virtual file system 211 first.

The file systems perform processing for the registration at a time of initialization. The audio CD file system 213 according to the present embodiment also performs the registration processing at a time of initialization. The registration processing is as follows.

Figure 3:
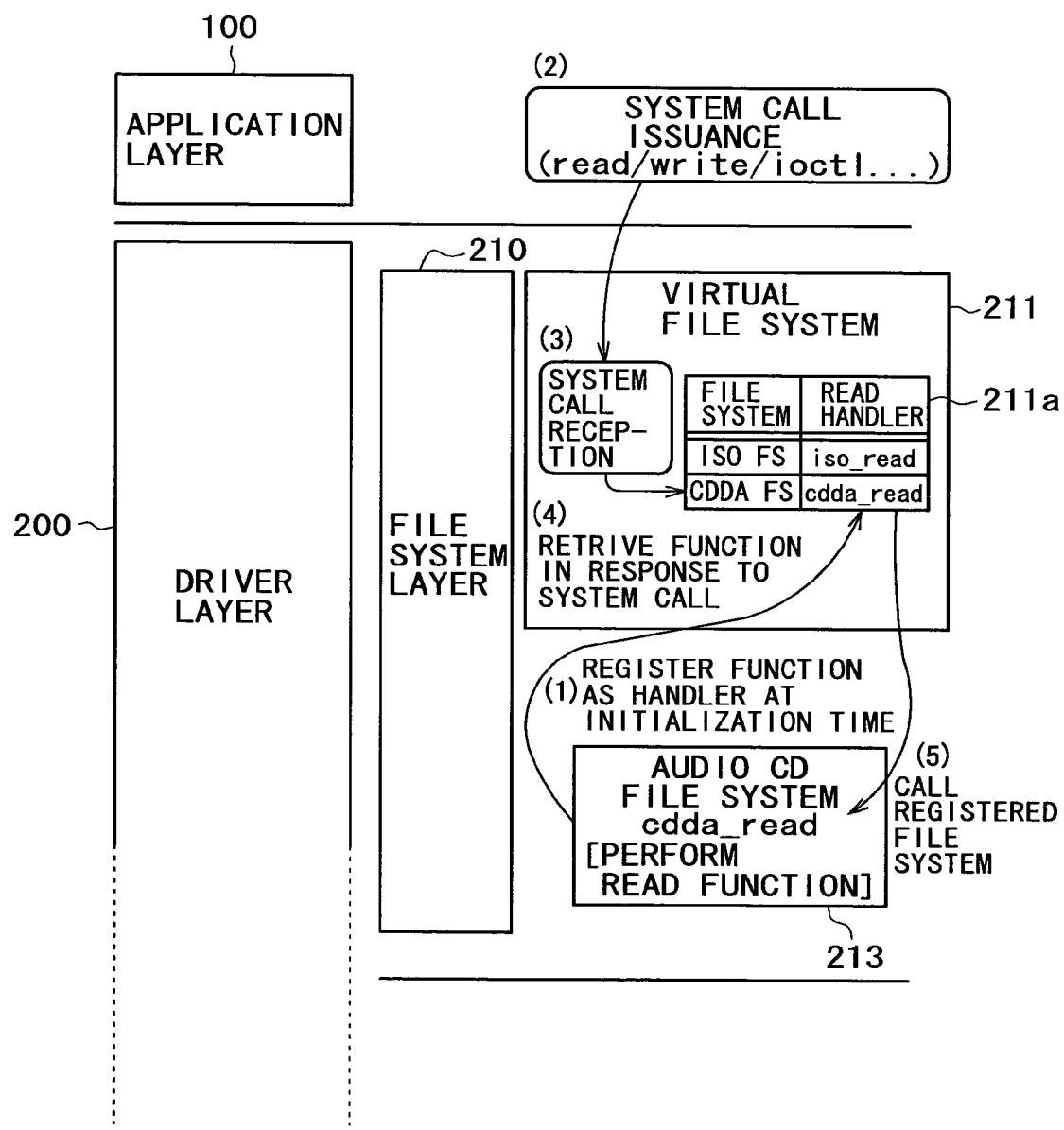
FIG. 3 is a diagram of assistance in explaining functions of a virtual file system and an audio CD file system in a file system layer according to the present embodiment.

As shown as a step (1) in FIG. 3, the registration processing of the audio CD file system 213 is performed by notifying a function serving as a handler to the virtual file system 211 from the audio CD file system 213 side and registering the function.

Since CD-DA is for reproduction only, the audio CD file system 213 registers a function of cdda_read functioning as a read handler.

In response to such registration processing, the virtual file system 211 has a register table 211a of registered file systems as shown in FIG. 3.

The register table 211a in this case shows that the ISO 9660 file system 212 (ISO FS) and the audio CD file system 213 (CDDA FS) are registered as file systems. As functions serving as handlers (read handlers), ISO_read is registered for the ISO 9660 file system 212, and cdda_read is registered for the audio CD file system 213.

When a function corresponding to a file system registered in the register table 211a as described above is to be performed, the virtual file system 211 performs processing as follows.

Suppose for example that as a file operation by the application software 102 in the application layer 100, a system call is made and a required command is issued as shown as a step (2) in FIG. 3. As shown as a step (3), the virtual file system 211 first receives the command issued by the system call. As shown as a step (4), the virtual file system 211 retrieves a function serving as a handler corresponding to received information of the system call from the register table 211a.

Supposing that the command as the system call is a read command to read data of a specified track from a CD-DA, for example, the virtual file system 211 retrieves the function cdda_read registered by the CD-DA file system from the register table 211a.

After retrieving the function cdda_read as described above, the virtual file system 211 calls the audio CD file system 213 as the registered file system, as shown as a step (5). In response to the call, the audio CD file system 213 side performs a read function.

Thus, the virtual file system 211 receives the command called from the command group 101 by the system call regarding file manipulation from the application layer 100. Then, in response to the received command, the virtual file system 211 has a function for requesting the driver of the appropriate file system of the registered file systems to perform a function corresponding to the command.

Incidentally, to make sure, such processing by the virtual file system 211 is performed similarly for the ISO 9660 file system 212 corresponding to CD-ROM.

By thus providing the virtual file system 211 between the real file systems and the application layer 100, the processing of control on the file systems from the application layer 100 can be standardized.

An outline of operation of the file systems, which are positioned directly under the virtual file system 211 as described above, according to the present embodiment will be described with reference to FIG. 4. Description in the following will be made by taking the audio CD file system 213 according to the present embodiment as an example of the file systems.

The audio CD file system 213 performs a read function in response to a request from the virtual file system 211, as described above. The read function includes the following two functions.

One function is to read a TOC recorded in a lead-in area of a CD-DA to obtain predetermined attribute information related to recorded contents of the CD-DA. The other function is to read the entity of audio data as a track recorded on the CD-DA.

Description will first be made of the function of reading a TOC of a CD-DA to obtain predetermined attribute information related to recorded contents of the CD-DA.

Figure 4:
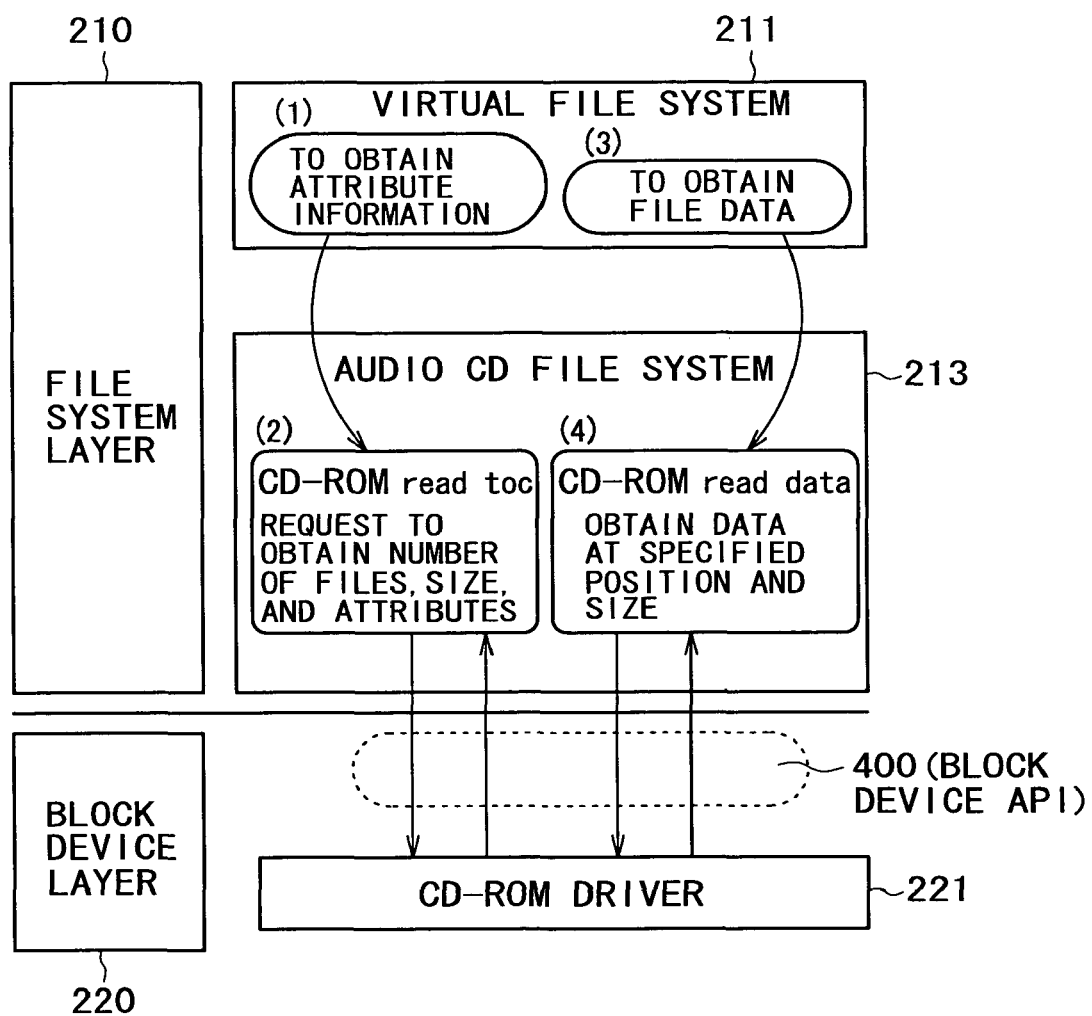
FIG. 4 is a diagram of assistance in explaining operation by the audio CD file system for controlling a device driver.

Suppose for example that as shown as a step (1) in FIG. 4, a request to obtain the attribute information is made from the virtual file system 211 to the audio CD file system 213.

As processing of the audio CD file system 213 in response to this, as shown as a step (2), the audio CD file system 213 issues and outputs a command CD-ROM read toc to the CD-ROM driver 221 in the block device layer 220.

The command CD-ROM read toc is a control command issued by the audio CD file system 213 to request the CD- ROM driver 221 to read the TOC of the CD-DA in the actual CD-DA format in response to the abstracted (standardized) request to obtain attribute information from the virtual file system 211.

A command CD-ROM read data to be described later is similar in this respect. When the control command is outputted to the CD-ROM driver 221, a block device API 400 corresponding to the CD-ROM driver 221 is used, as shown in FIG. 4.

As described above, the command CD-ROM read toc is a request to read the TOC recorded in the lead-in area from the disk in the CD format loaded in the disk drive 19. The TOC is read by the command CD-ROM read toc as a request to obtain attribute information for the following reasons.

As is well known, the TOC of the CD-DA includes a first and a last track number and information indicating a reproduction start position of each track by an absolute time of [minutes, seconds, frames]. On the basis of this information, it is possible to determine the reproduction time of each track and further calculate data size from the reproduction time of each track.

For example, as is well known, the TOC is formed by a Q channel of a sub-coding frame. Control bits are stored in the sub-coding frame, indicating various attributes such as presence or absence of emphasis, the number of audio channels, a music/data distinction, and the like. Incidentally, information of such control bits and the like is treated as part of the TOC in the present embodiment.

Necessary information as the attribute information related to the CD-DA is data size of tracks indicated as an attribute within a list of files as the tracks and information stored in a disk/track information file (disc.inf) as will be described later with reference to FIG. 6. These pieces of information can be generated on the basis of contents of the TOC recorded on the CD-DA. Thus, by issuing the command CD-ROM read toc, obtaining the TOC, and knowing the contents of the TOC, the audio CD file system 213 obtains information on the number of files or tracks, data size of each track, and attributes, for example, and is consequently able to generate and obtain attribute information including these pieces of information.

The following can be said when comparison is made about the point described above with the ISO 9660 file system corresponding to the logical format of CD-ROM.

When the ISO 9660 file system 212 is requested to obtain attribute information, for example, unlike the audio CD file system 213, the ISO 9660 file system 212 does not control the CD-ROM driver 221 to read a TOC.

As is well known, the TOC of a lead-in area of a CD-ROM conforming to the ISO 9660 format, for example, is only described such that the disk as a whole appears as one audio track and does not indicate file structure or directory structure of data actually recorded on the CD-ROM. The directory structure of the data recorded on the CD-ROM is generally described in a path table having an address specified by Primary Volume Descriptor (PVD).

Hence, when the ISO 9660 file system 212 is requested to obtain attribute information, the ISO 9660 file system 212 outputs a control command to read the path table of the CD-ROM to the CD-ROM driver 221. Then, on the basis of contents of the read path table, attribute information of each file to be possessed by the ISO 9660 file system 212 can be obtained.

Thus, in obtaining attribute information, the audio CD file system 213 operates to read information different from that of the existing ISO 9660 file system 212, for example.

The TOC recorded in the lead-in area of the CD-DA can be said, in view of comparison of contents described therein with those of a CD-ROM, to describe information, which is recorded as information unique to the CD-DA, related to the disk. The audio CD file system 213 according to the present embodiment reads disk-related information as such information related to the disk and then retains files as described later with reference to FIG. 6, for example, as a mount result.

The function of reading the entity of audio data as a track recorded on the CD-DA will next be described. Incidentally, the read function is enabled after the attribute information is obtained by TOC reading as steps (1) and (2) in FIG. 4, by using the obtained attribute information.

Suppose for example that as shown as a step (3) in FIG. 4, a request to read file data is made from the virtual file system 211.

The file data in the case of the audio CD file system 213 is audio data in a unit of a track recorded on the CD-DA. Accordingly, in response to the request to read the file data, as shown as a step (4), the audio CD file system 213 issues and outputs a command CD-ROM read data as a control command to the CD-ROM driver 221.

In response to the command CD-ROM read data, the interfaces in the layer of the CD-ROM driver 221 and the lower layers read the file data specified from the disk drive 19. That is, the interfaces determine which track corresponds to the specified file data, access a start position of the track on the CD-DA, and perform actual data reading.

FIGS. 5A, 5B, 5C, 5D, 5E, and 5F show functional constituent parts of the audio CD file system 213, which parts are divided in correspondence with the operations of the audio CD file system 213 described thus far.

FIGS. 5A, 5B, 5C, 5D, 5E, and 5F show the constituent parts of the audio CD file system 213 according to operational relations with the OS for controlling the system. In the following, for convenience of description, the OS for controlling the system is Linux, and a case where the audio CD file system 213 functions on the system as Linux will be taken as an example.

As shown in the figures, the audio CD file system 213 includes an initialization/registration processing part 501 shown in FIG. 5B, a file attribute processing part 502 shown in FIG. 5D, and a readout processing part 503 shown in FIG. 5F.

When the file system is incorporated in a kernel of the OS, for example, an initialization processing part of the OS initializes and registers the file system at a time of file system loading performed at a time of a start of the system, for example. When the initialization is performed manually, the initialization and registration are performed by a file system loading command.

Thus, the audio CD file system 213 is to first perform the initialization and registration processing. The initialization/ registration processing part 501 in the audio CD file system 213 is a functional part for performing the initialization and registration processing.

First, as actual initialization processing by the OS for controlling the system as shown in FIG. 5A, calling of a predetermined function to initialize the audio CD file system is performed as a system call, for example. Supposing for example that manual initialization is performed and that a file system type of the audio CD file system 213 is defined as cddafs, a command called by the system call is insmod cddafs

In response to the command, the system controlling OS calls the initialization/registration processing part 501 of the audio CD file system 213 to perform the initialization/registration processing.

While the initialization/registration processing by the initialization/registration processing part 501 of the audio CD file system 213 shown in FIG. 5B has been described earlier as the step (1) in FIG. 3, further supplementary description of the initialization/registration processing will be made in the following.

The audio CD file system 213 notifies a registration name of the file system to the system controlling OS side. The audio CD file system 213 also notifies a handler such as a function or the like corresponding to the function of the file attribute processing part 502 to be described next. The handler such as a function or the like is the function (cdda_read) to be registered in the register table 211a of the virtual file system 211 by the step (1) in FIG. 3, for example. Thereby, as shown in FIG. 3, the audio CD file system (CDDA FS) is registered in the register table 211a of the virtual file system 211. Incidentally, in actual notification of the handler, a pointer of the handler is notified.

By performing such notification, the audio CD file system is registered, and the system controlling OS recognizes that the initialization is completed.

Incidentally, in order to refer to currently registered file systems, a cat command used for display of file contents can be utilized. In order to refer to the registered audio CD file system 213, it suffices to execute a command such as for example as cat/proo/filesystemsnodev bdev . . . cddafs

When the initialization/registration processing as shown in FIGS. 5A and 5B is completed, the audio CD file system 213 is incorporated in the system controlling OS. When the system controlling OS side thereafter recognizes that a CD-DA is loaded into the disk drive 19, for example, the system controlling OS performs so-called mount processing as shown in FIG. 5C.

As a result of completion of this mount processing, the audio CD file system 213 is assigned to the disk drive 19 and is then able to read data recorded on the CD-DA loaded in the disk drive 19 as a file group.

On an assumption that the disk drive 19 is a CD-ROM drive as a device, for example, a command for this mount processing is represented by mount-t cddafs/dev/cdrom/mnt

This is a command to mount the audio CD file system 213 as a file on the device (/dev/cdrom) as the CD-ROM drive at a mount point/mnt. Thereby, the file attribute processing part of the audio CD file system 213 is called, as will be described later. Then, a TOC within the CD-DA is read. The number of tracks, data size of each track, and the like are determined from contents of the read TOC. As a result, recorded contents of the CD-DA are seen as files from the application layer 100.

In response to the mount command, the file system layer 210 makes a request to obtain attribute information as described earlier as the step (1) in FIG. 4. That is, first the virtual file system 211 makes a request to obtain attribute information to the audio CD file system 213.

The file attribute processing part 502 of the audio CD file system 213 shown in FIG. 5D is a processing part for obtaining the attribute information in response to the request to obtain the attribute information. Specifically, the file attribute processing part 502 outputs to the CD-ROM driver 221 a control command (CD-ROM read toc) to read the TOC required to obtain the attribute information from the CD-DA, as described as the step (2) in FIG. 4.

Thereby the layers lower than the file system layer 210 perform operation to actually read the TOC from the CD-DA loaded in the disk drive 19, and then the audio CD file system 213 can obtain the TOC.

In performing the above mount processing, the audio CD file system 213 side notifies a pointer of a handler such as a function or the like corresponding to the function of the readout processing part 503 of the audio CD file system 213 to be described next.

On the basis of the TOC obtained by the audio CD file system 213 as a result of the above-described operation of the file attribute processing part 502, various information such for example as the number of pieces of file data corresponding to the number of tracks recorded on the CD-DA, data size of each piece of file data, and various additional information related to the recorded contents of the CD-DA is obtained.

In practice, these pieces of information are created as a file group that can be referred to by the application software 102 side. These files are stored in a required directory by the mount processing. Thereby the application layer 100 side can refer to the contents recorded on the CD-DA as a file list. Incidentally, a concrete example of such a file list will be described later with reference to FIG. 6.

After the mount processing is performed as described above, the readout processing part 503 of the audio CD file system 213 shown in FIG. 5F performs readout processing in response to readout processing from the system side shown in FIG. 5E, whereby audio data in a unit of a track can be read from the CD-DA.

In a stage where the audio CD file system 213 is mounted, the recorded contents of the CD-DA are seen as files stored in the predetermined directory from the application layer 100 side. Hence, as the readout processing from the system side shown in FIG. 5E, it is possible to specify a file address and data size and make a readout request as for an ordinary file.

In practice, readout can be performed by executing a common copy command called by a system call, for example. A concrete example of the command is as follows:

cp /mnt/track01.cda

The command is to copy data of a file name track01.cda, that is, audio data of track number 1 recorded on the CD-DA into the current directory (/mnt). As is understood from the use of such a command, it is possible to read a file from the CD-DA by a file manipulation similar to normal file manipulation.

In response to the copy command, the audio CD file system 213 performs processing by the function of the readout processing part 503 shown in FIG. 5F so that audio data is actually read from the CD-ROM drive of the disk drive 19. Incidentally, the actual reading of audio data from the CD-ROM drive in this case has been described earlier as the steps (3) and (4) in FIG. 4.

FIG. 6 shows a concrete example of a list of files mounted by the mount processing shown in FIG. 5C and FIG. 5D. The file list shown in FIG. 6 corresponds to a result of mounting a CD-DA on which 14 audio tracks are recorded.

Each file shown in the list of FIG. 6 presents file attributes in accordance with the Linux OS. Specifically, a file type to distinguish a directory (d), a normal file (-) or the like, and access right (r:w:x) information are first shown from the left, followed by the number of links, a file owner, and a name of a group to which the file owner belongs. Further, a file size normally expressed in bytes, a date and time of file update, and a file name are shown.

Incidentally, in order to refer to the list of files mounted as the audio CD file system 213 as shown in FIG. 6, it suffices to use a command ls, which is a normal file reference command, and execute for example ls-al/mnt

Audio data files in the file list shown in FIG. 6 will first be described.

FIG. 6 shows presence of a total of 14 audio data files in correspondence with the fact that 14 tracks corresponding to 14 musical pieces are recorded on the CD-DA. Each of the 14 audio data files corresponds to the entity of audio data in a unit of a track recorded on the CD-DA.

Incidentally, to make sure, each audio data file shown in FIG. 6 only shows audio data in a unit of a track recorded on the CD-DA as a file to the application layer 100 side, and the entity of the audio data file is recorded on the CD-DA.

Each of the audio data files is provided with a file name corresponding to a track number recorded on the CD-DA, such as a file name of track01.cda to track14.cda, for example. List items of the audio data files show data size as an attribute. Hence, the file name and the data size of each audio data file are known by referring to the list item of the audio data file.

The data size information can be generated from the TOC information recorded on the CD-DA. Specifically, as is well known, a start position of each track is represented by [minutes, seconds, frames] as contents of the TOC. Therefore, it suffices to obtain the reproduction time of each track on the basis of this information of [minutes, seconds, frames], and the reproduction time of each track is converted into data size, for example.

A disk/track information file that is given a file name disc.inf is present in the file list shown in FIG. 6. Though an example of information contents of the disk/track information file (disc.inf) will be described next, the disk/track information file (disc.inf) indicates additional information on the CD-DA itself and each track recorded on the CD-DA as recorded contents of the CD-DA currently mounted as the audio CD file system 213.

This disk/track information file (disc.inf) can be generated on the basis of the TOC information read from the CD-DA by the file attribute processing part 502 described earlier. It is to be noted that in this case, control bits of Q channel sub-code and the like are included in the TOC information.

FIG. 7 shows an example of a structure of the disk/track information file (disc.inf). It is to be noted that the disk/track information file (disc.inf) shown in FIG. 7 is included in the list shown in FIG. 6. That is, FIG. 7 shows an example of contents when the CD-DA having 14 tracks recorded thereon is mounted as the audio CD file system 213.

As shown in FIG. 7, the contents of the disk/track information file (disc.inf) are roughly divided into disk information and track information.

The disk information is an area for storing information on the data as a whole recorded on the CD-DA. In the area, ftno or information indicating a first track number and ltno or information indicating a last track number are stored, each having a predetermined data size.

Generally track numbers of a plurality of tracks recorded on one CD-DA are given in ascending order starting with one. However, when a plurality of CD-DAs constitute one album, for example, a second and subsequent CD-DAs, for example, may be given track numbers continued from a first CD-DA. Such track number information needs to be read correctly when the audio CD file system is used to read data of an audio track as a file, for example. The ftno and ltno as the disk information are provided to properly read audio data files in such a case.

Specifically, suppose for example that there is an album including a set of two CD-DAs, and that tracks having track numbers 1 to 10 are recorded on a first CD-DA and tracks having track numbers 11 to 20 are recorded on the second CD-DA. In this case, when the audio CD file system is mounted for the first CD-DA, the ftno and ltno as the disk information stored are ftno=1
ltno=10

On the other hand, when the audio CD file system is mounted for the second CD-DA, the ftno and ltno as the disk information stored are ftno=11
ltno=20

The track information is an area for storing required additional information on each audio track file. The directory information shown in FIG. 6 is related to the CD-DA having 14 tracks recorded thereon, and there are 14 files track01.cda to track14.cda present as audio data files. The track information shown in FIG. 7 correspondingly includes information of each of track01 to track14.

Information of each audio data file corresponding to each track as the track information includes information of emp, data, nocopyright, and audio_ch, as shown in FIG. 7, for example.

Information indicating whether equalizing processing referred to as emphasis or preemphasis has been performed on the audio data is stored in emp. On the basis of this information, a reproduction processing side as the application software side, for example, can properly perform on/off switching of signal processing corresponding to emphasis.

Data includes information indicating whether the recorded data is audio data or not. By referring to this information, it is possible to properly determine whether the recorded data is to be reproduced as audio data.

Nocopyright includes information related to copy restriction. In this case, nocopyright includes three pieces of information, that is, copyright information, information indicating whether copying is allowed, and information indicating whether the disk is a CD-R Audio.

The copyright information is information with predetermined contents related to a so-called copyright on the track. The information indicating whether copying is allowed includes a flag indicating whether copying is allowed or prohibited. By referring to the information indicating whether the disk is a CD-R Audio, it is possible to determine whether the data of the track is audio data recorded on a CD-R. By referring to these pieces of information as nocopyright, it is possible to perform recording control operation as proper copy restriction operation.

Further, audio_ch includes information indicating the number of audio channels of the track. The number of audio channels recorded on a CD-DA is usually two channels L and R, whereas there are some CD-DAs recorded by four channels, for example. Audio_ch indicates such a number of channels. By referring to this information, it is possible to switch to appropriate reproduced signal processing corresponding to the number of channels of the audio data.

The meaning of providing such a disk/track information file (disc.inf) in the audio CD file system 213 will be described in the following by comparison with the ISO 9660 file system corresponding to CD-ROM.

The disk/track information file (disc.inf) can be said to be a file unique to the audio CD file system 213 corresponding to CD-DA and is not present in the ISO 9660 file system 212.

Specifically, the ISO 9660 format of CD-ROM is originally based on an assumption that data recorded on a CD-ROM is file data to be processed by a computer system. Hence, as described above, for example, by only mounting the ISO 9660 file system 212 on the basis of contents of a path table read from the CD-ROM, attributes required to manipulate files recorded on the CD-ROM are obtained as the contents themselves of the path table.

On the other hand, data recorded on CD-DA was originally not assumed to be file data capable of being processed by a computer, for example, and CD-DA has a format based on an assumption that CD-DA is reproduced by an audio reproducing apparatus such as a CD player or the like.

Consequently, for example, only the file name and data size of an audio data file created in correspondence with each track can be recognized as attributes of the file, as is understood with reference to FIG. 6. However, when data in a unit of a track recorded on a CD-DA is to be properly manipulated on a computer system in practice, information related to attributes other than the file name and data size is required.

Consideration will be given to for example a case where the information of the first/last track number as shown as the disk information in FIG. 7 does not exist as attribute information. In this case, when a certain track is specified to perform readout from a CD-DA having a first track number other than one, it may be impossible to perform proper readout because the number of the specified track cannot be recognized correctly without the first track number as a starting number.

It is thus understood that only attribute information added to only audio data files is not sufficient for proper file manipulation to be performed on the application side operating on the CD-DA.

Accordingly, the present embodiment creates attribute information lacking in the attributes added to only audio data files as the disk/track information file (disc.inf) and provides the attribute information as one of the files of the audio CD file system 213.

Thus, by reading and referring to the disk/track information file (disc.inf), the application layer 100 side can properly manipulate the audio data files for the CD-DA. Further, depending on contents of the disk/track information file (disc.inf), more advanced file manipulation can be realized.

Description now returns to FIG. 6.

Next to the above-described disk/track information file (disc.inf), a CD-text information file (file name: cd_text.inf) is shown.

As is well known, sub-code is inserted and recorded on a CD-DA together with digital audio data. Text data can be inserted as information to be stored in a sub-coding frame including the sub-code. This data is so-called CD-text information and includes data that it is considered appropriate to present by text according to recorded contents of the CD-DA, such for example as an album name of the CD-DA, a name of an artist, and a title name of each track.

The CD-text information file (file name: cd_text.inf) is created and registered when such CD-text information is stored on the CD-DA.

Though detailed description will be omitted, the CD-text information file (file name: cd_text.inf) is created on the basis of sub-coding frame data extracted by reading a signal recorded in a data area of the CD-DA.

An example of operation of the application software 102 using the audio CD file system 213 described thus far will next be described. In the following, a case where the application software 102 is so-called ripping software will be taken as an example.

To make sure, ripping in this case refers to reading audio data in a unit of a track recorded on a CD-DA loaded in the disk drive 19, converting the audio data into a compressed audio data file as required, and then storing the audio data as an audio data file on the HDD 21. The ripping software has a program for allowing the CPU 11 to perform processing for such ripping. The ripping software further includes programs for managing audio data files stored on the HDD 21 by ripping and for allowing processing such for example as reproduction and editing to be performed.

Figure 8:
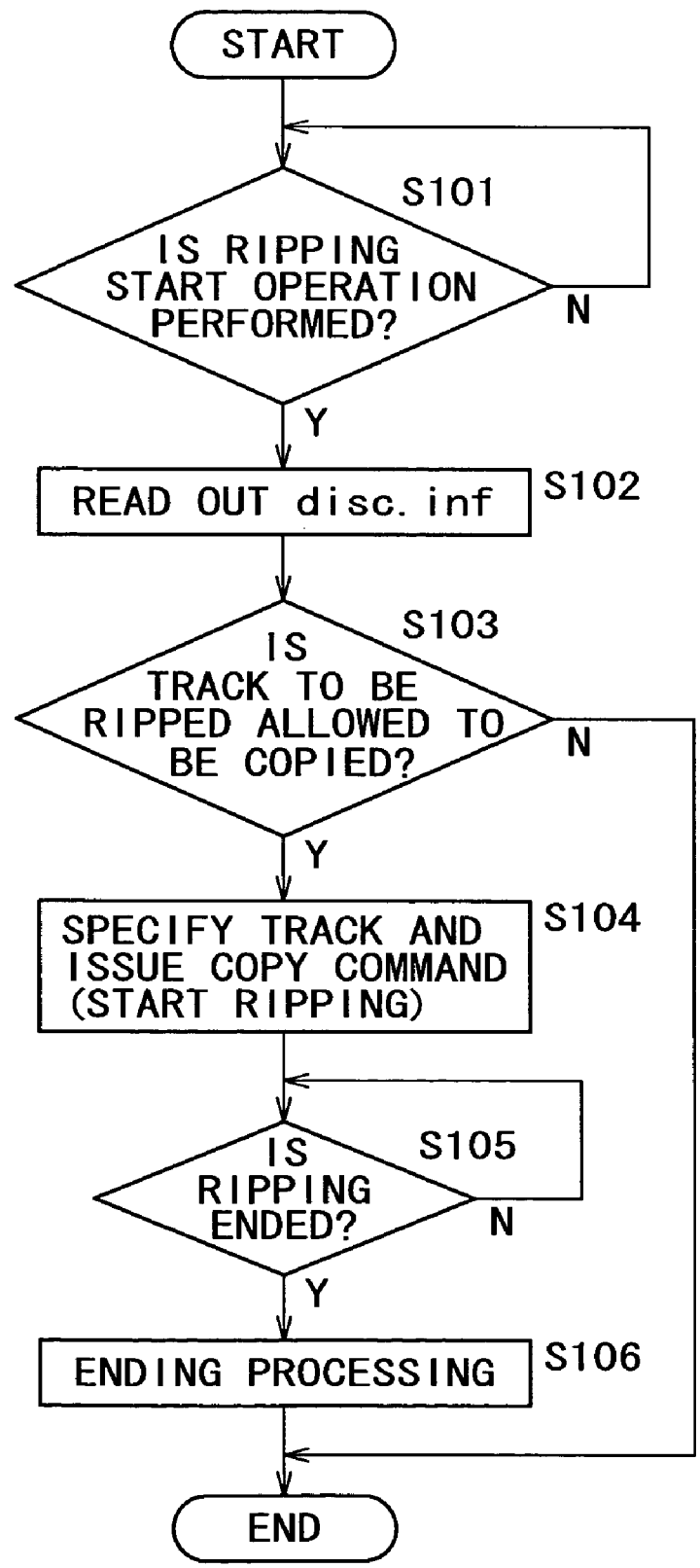
FIG. 8 is a flowchart representing an example of processing operation for ripping by ripping software.

FIG. 8 represents processing operation when such ripping software performs ripping. The processing represented in FIG. 8 is realized by for example starting the ripping software on the system controlling OS and executing a program. It is assumed that before the processing represented in FIG. 8, a CD-DA has already been loaded into the disk drive 19 and mount processing for the loaded CD-DA has already been completed. That is, from the side of the OS and the ripping software in the application layer 100, contents recorded on the CD-DA can be recognized as files as shown in FIG. 6 and FIG. 7, for example.

Under conditions where the ripping software is started as described above, at a first step S101, the recording and reproducing apparatus 1 stands by until an operation for starting ripping is performed as a user operation on the ripping software by means of the operating input unit 15, for example.

When the operation for starting ripping is performed after a track to be ripped is specified by a predetermined operation by the user, for example, the recording and reproducing apparatus 1 proceeds from the step S101 to processing from a step S102 on down.

At the step S102, a disk/track information file (disc.inf) is read from the files mounted by the audio CD file system 213 as shown in FIG. 6.

At a next step S103, whether the track specified for ripping by the user operation is allowed to be copied is determined on the basis of contents of the disk/track information file (disc.inf) read at the step S102.

In the determination at the step S103, nocopyright information of the track specified for ripping is referred to in the structure of the disk/track information file (disc.inf) shown in FIG. 7. On the basis of a result of the reference, whether the track to be ripped is allowed to be copied is determined.

For example, the determination of whether the copying is allowed on the basis of the nocopyright information can be made by using information indicating whether copying is allowed in nocopyright. That is, it is possible to determine that the copying is allowed when the information indicating whether copying is allowed indicates that copying is allowed, and that the copying is not allowed when the information indicating whether copying is allowed indicates that copying is not allowed.

When it is determined as a result of the determination at the step S103 that the track to be ripped is not allowed to be copied, the processing represented in FIG. 8 is ended without further processing. That is, the processing for ripping the specified track is not performed. Incidentally, it is desirable that when the processing for ripping the track is thus ended without being performed, the ripping software make a display indicating that ripping is not performed because the track is not allowed to be copied, or the like.

When a positive result indicating that the track to be ripped can be copied is obtained at the step S103, on the other hand, the processing proceeds to a step S104.

At the step S104, the track specified for ripping is specified, and a copy command is issued. As described earlier, this is realized by making a system call for a copy command (cp) to the system controlling OS by the ripping software, for example. As described earlier, in response to the copy command, the audio CD file system 213 outputs a control command to read data of the specified track from the CD-DA to the CD-ROM driver 221. Thereby, the data of the specified track is read from the CD-DA loaded in the disk drive 19.

At the step S104, processing for subjecting the audio data of the specified track read from the CD-DA to data compression according to a predetermined format as required, transferring the audio data to the HDD 21, and writing the audio data as an audio file to the HDD 21 is also started.

Thus, ripping operation is started at the step S104.

Incidentally, as with the CD-ROM drive, the HDD 21 is a block device. Therefore, though not shown in FIG. 2, a file system corresponding to the HDD 21 is present in the file system layer 210, and a device driver and a bus driver corresponding to the HDD 21 are present in the block device layer and the bus driver layer, respectively. The HDD 21 is positioned in the hardware layer 300.

Thus, the processing, which accompanies the ripping process at the step S102, of writing the audio data file to the HDD 21 is performed by the interfaces of the file system, the device driver, the bus driver, and the like corresponding to the HDD.

For example, in writing data to the HDD 21, a write request is made from the application layer 100 side. In response to the write request, the file system of the HDD outputs a control command to write the data to the device driver corresponding to the HDD.

At a step S105, the recording and reproducing apparatus 1 stands by until the ripping operation started at the step S104 is ended. When a positive result indicating that the ripping operation is ended is obtained at the step S105, the processing proceeds to a step S106. At the step S106, required ending processing is performed.

Thus, before ripping aimed at the CD-DA loaded in the disk drive 19 is performed, whether copying by ripping is allowed is determined by referring to the nocopyright information of the disk/track information file (disc.inf) describing additional information related to the CD-DA among the files mounted by the audio CD file system 213. The ripping operation can be restricted on the basis of a result of the determination.

Thus, the audio CD file system 213 according to the present embodiment has the disk/track information file (disc.inf) unique to the CD-DA. The file is not present in the other file systems. The application software to perform file processing on the CD-DA can perform proper file processing by referring to the disk/track information file (disc.inf).

Such a disk/track information file (disc.inf) is seen as a file from the application software side. Hence, when the application software reads the disk/track information file (disc.inf), it suffices to read the disk/track information file (disc.inf) by a file manipulation similar to normal file manipulation.

A comparison of FIG. 2 showing the system hierarchy according to the present embodiment described earlier with FIG. 9 showing a conventional system hierarchy will be made as a summary. Incidentally, in FIG. 9, the same parts as in FIG. 2 are identified by the same reference numerals, and description thereof will be omitted.

Figure 9:
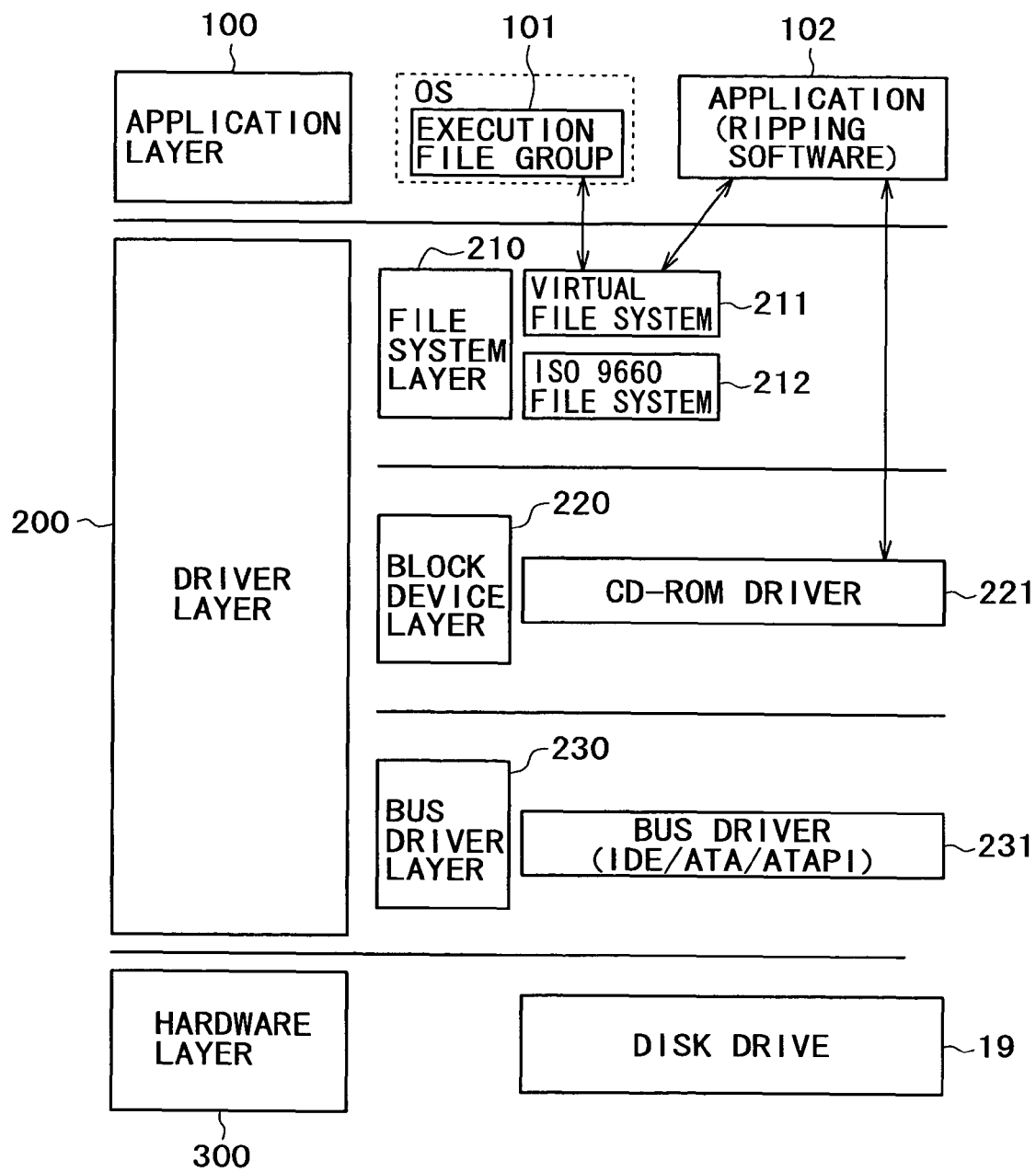
FIG. 9 is a diagram of assistance in explaining a conventional system hierarchy.

As is understood from the comparison of the system hierarchy shown in FIG. 9 with the system hierarchy according to the present embodiment shown in FIG. 2, conventionally an audio CD file system 213 is not present in a file system layer 210.

With a system configuration shown in FIG. 9, when a CD-ROM in the ISO 9660 format is loaded into a disk drive 19, an ISO 9660 file system 212 is mounted. Therefore, by using a standardized command by a system call, for example, an application layer 100 side can manipulate data recorded on the CD-ROM through a file manipulation similar to normal file manipulation.

That is, application software operating on a CD-ROM can be created and designed as a program using standardized commands by a system call provided by the system or the like.

However, the audio CD file system 213 is not present in the conventional system hierarchy.

Therefore, when application software to operate on a CD-DA such for example as ripping software performs data manipulation on a CD-DA, the application software needs to be directly interfaced with a CD-ROM driver 221 positioned in a block device layer 220, as shown in FIG. 9. That is, a program needs to be constructed such that the application software actually recognizes a TOC recorded on the CD-DA and a recording position of audio data of each track to perform data manipulation.

That is, conventionally, in creating application software that manipulates data recorded on the CD-DA, a program for enabling file manipulation specific to the CD-DA needs to be implemented, rather than a program based on normal file manipulation commonly usable on the basis of the system.

Therefore, for example each piece of application software 102 operating on the CD-DA needs to be created by implementing a program for enabling file manipulation specific to the CD-DA as described above. Thus, the conventional system presents a problem of inefficiency in creating the program.

Accordingly, in the present embodiment, the audio CD file system is placed in the same hierarchical position as the ISO 9660 file system 212, which is one of conventionally existing CD-ROM file systems, as shown in FIG. 2.

Thereby application software operating on the CD-DA can also be created and designed on the basis of a program allowing data manipulation by issuing commands by a system call, for example.

Thus, as with application software corresponding to CD-ROM, creation of programs of various application software operating on CD-DA can be made simpler than conventional.

It is to be noted that the present invention is not limited to the configuration described above.

For example, the apparatus to which the present invention is applied is not limited to the recording and reproducing apparatus 1 capable of ripping with the configuration shown in FIG. 1, and the present invention is applicable to recording and reproducing apparatus employing other configurations, for example. Further, the present invention is applicable effectively to a system as a mere personal computer.

Also, a file configuration obtained by mounting the audio CD file system is not limited to that shown in FIG. 6. The contents of the disk/track information file (disc.inf), in particular, are not limited to those shown in FIG. 7, and various contents are conceivable.

Further, while the audio-only file system according to the present embodiment described above corresponds to CD-DA, Mini Disc (trademark) (MD), for example, is also known as an audio-only disk medium. The present invention can be applied to a system having a device corresponding to such Mini Disc by providing a file system corresponding to Mini Disc, for example. Of course, the present invention is applicable to other audio-only media other than CD-DA and MD.

Further, the concept of the present invention is applicable not only to audio-only media but also to video data-only media, for example.

The program according to the present invention is a program as a system (OS) constructed so as to provide system operation with the audio CD file system described with reference to drawings as the present embodiment, for example.

In the case of the present embodiment, the program is stored in the ROM in the memory 13 (or the HDD 21).

Alternatively, the program can be stored (recorded) temporarily or permanently on a removable recording medium such as a flexible disk, a Compact Disc Read Only Memory (CD-ROM), an Magneto-Optical (MO) disk, a Digital Versatile Disc (DVD), a magnetic disk, a semiconductor memory, or the like. Such a removable recording medium can be provided as so-called packaged software.

For example, in the case of the present embodiment, the program can be recorded on a CD-ROM or the like and be provided as packaged software. Thus, the recording and reproducing apparatus 1 can install the program therein by reproducing the CD-ROM, thereby reading the program, and storing the program in the ROM of the memory 13. Further, such packaged software makes it possible to install the system program to which the present invention is applied also in a general-purpose personal computer, for example.

In addition to being installed from a removable recording medium as described above, the program can also be downloaded from a server or the like storing the program via a network such as a Local Area Network (LAN), the Internet, or the like.

Further, it is conceivable that for example an update program for adding the functions of the audio CD file system according to the present invention afterwards is constructed and that the update program is distributed as a packaged medium or distributed on a network. It suffices for the user to obtain the update program and install the update program in an environment where an existing system is installed.

As described above, the present invention provides the audio-only file system in the file system layer as a system in the information processing apparatus.

Thus, an application at a higher level can perform data manipulation corresponding to an audio-only disk-shaped recording medium such for example as a CD-DA in a manner similar to normal file manipulation, using a system call as a mechanism for calling a standardized command in the system controlling OS, for example.

Thus, a program as application software operating on an audio-only disk-shaped recording medium can be created with a program configuration similar to a program configuration heretofore used for performing file manipulation using normal commands and the like, rather than a program configuration for directly manipulating data on a CD-DA. That is, the creation of the program as application software operating on an audio-only disk-shaped recording medium can be made simpler than before.

Further, the audio-only file system according to the present invention functions to read disk-related information (TOC) from an audio-only disk-shaped recording medium and generate a disk-related information file having contents as additional information related to the audio-only disk-shaped recording medium.

By referring to the disk-related information file, the application software operating on the audio-only disk-shaped recording medium can for example properly read (or write) data and process the read data and perform such processing at a higher level. In addition, as processing of issuing commands for this, processing corresponding to normal file manipulation suffices and thus simplicity of creation of the program on the application software side is maintained also in this respect.

While a preferred embodiment of the invention has been described using specific terms, such description is for illustrative purposes only, and it is to be understood that changes and variations may be made without departing from the spirit or scope of the following claims.

What is claimed is:

1. An information processing apparatus for reproducing an audio-only disk-shaped recording medium, said apparatus comprising:
    a disk receiving means for receiving at least the audio-only disk-shaped recording medium;
    reproducing means for reproducing an audio data signal from said audio-only disk-shaped recording medium;
    storing means for storing data; and
    controlling means for controlling reproduction of audio data from said audio-only disk-shaped recording medium on the basis of control information stored in said storing means;
    wherein said controlling means controls the reproduction of said audio data on the basis of system controlling software stored in said storing means, said controlling means configured to provide:
    an application layer for converting a request from application software into a predetermined command and outputting the predetermined command, wherein the predetermined command is independent of a type of file system being used; and
    a driver layer having a file system layer including a virtual file system and an audio-only file system, wherein the virtual file system receives the predetermined command from the application layer, determines a corresponding control command for the audio-only file system, and outputs the corresponding control command to the audio-only file system which outputs the received corresponding control command to a device driver in a device layer for said reproducing means to read the audio data from said audio-only disk-shaped recording medium, and to control the disk receiving means corresponding to said corresponding control command.

2. The information processing apparatus as claimed in claim 1,
    wherein said file system layer outputs to said device layer a disk-related information readout control command to read out disk-related information having predetermined information related to recorded data recorded on said audio-only disk-shaped recording medium; and
    said file system layer generates a disk-related information file including additional information related to the recorded data recorded on said audio-only disk-shaped recording medium on the basis of the disk-related information outputted on the basis of said disk-related information readout control command.

3. The information processing apparatus as claimed in claim 2,
    wherein said file system layer generates said disk-related information file such that said disk-related information file includes recording control information that is referred to when the recorded data recorded on said audio-only disk-shaped recording medium is to be recorded onto another recording medium.

4. The information processing apparatus as claimed in claim 3,
    wherein when said recording control information indicates that the recorded data recorded on said audio-only disk-shaped recording medium is allowed to be recorded onto another recording medium, said file system layer generates a control command to reproduce the recorded data from said audio-only disk-shaped recording medium, generates a recording control command to control another recording medium on which to record said recorded data, and outputs said generated recording control command to a device driver that controls recording means for recording the data onto said other recording medium.

5. The information processing apparatus as claimed in claim 2,
wherein said disk-related information is obtained from sub-code data read from said audio-only disk-shaped recording medium.

6. The information processing apparatus as claimed in claim 1, wherein said file system layer further includes a second file system different from the audio-only file system, the second file system corresponding to a disk-shaped recording medium on which computer data is recorded, the virtual file system being configured to determine a second corresponding control command for the second file system and output the second corresponding control command to the second file system, the second file system being configured to allow the disk-shaped recording medium on which computer data is recorded to be reproduced by said reproducing means when the disk-shaped recording medium on which computer data is recorded is received in the disk receiving means.

7. The information processing apparatus as claimed in claim 6, the second file system being an ISO 9660 file system for storing computer data which is recorded on the basis of an ISO 9660 format.

8. The information processing apparatus as claimed in claim 1,
wherein said file system layer is included in operating system software that controls said information processing apparatus.

9. The information processing apparatus as claimed in claim 1, the virtual file system including a register table which stores a plurality of corresponding control commands of a file system;
the virtual file system being configured to register one of a plurality of corresponding control commands of the audio-only file system in the register table, to retrieve from the register table one of the plurality of corresponding control commands based on the predetermined command inputted from the application layer, and to send the corresponding control command to the audio-only file system.

10. An information processing method, implemented on an information processing apparatus, for reading an audio signal from an audio-only disk-shaped recording medium inserted into a disk receiving unit of the information processing apparatus, and reproducing the audio signal, said method comprising:
converting, at an application layer provided by the information processing apparatus, a request from application software into a predetermined command in a file system layer and outputting the predetermined command, wherein the predetermined command is independent of a type of file system being used; and
receiving, at the file system layer provided by the information processing apparatus, the predetermined command from the application layer, the file system layer including a virtual file system and an audio-only file system, wherein the virtual file system receives the predetermined command from the application layer, determines a corresponding control command for the audio-only file system, and outputs the corresponding control command to the audio-only file system, the audio-only file system outputting the received corresponding command to a device driver in a device layer for said disk receiving unit to read audio data from said audio-only disk-shaped recording medium, to control said disk receiving unit corresponding to said corresponding control command.

11. The information processing method as claimed in claim 10,
wherein said file system layer outputs to said device layer a disk-related information readout control command to read out disk-related information having predetermined information related to recorded data recorded on said audio-only disk-shaped recording medium; and
said file system layer generates a disk-related information file including additional information related to the recorded data recorded on said audio-only disk-shaped recording medium on the basis of the disk-related information outputted on the basis of said disk-related information readout control command.

12. The information processing method as claimed in claim 11,
wherein said file system layer generates said disk-related information file such that said disk-related information file includes recording control information that is referred to when the recorded data recorded on said audio-only disk-shaped recording medium is to be recorded onto another recording medium.

13. The information processing method as claimed in claim 12,
wherein when said recording control information indicates that the recorded data recorded on said audio-only disk-shaped recording medium is allowed to be recorded onto another recording medium, said file system layer generates a control command to reproduce the recorded data from said audio-only disk-shaped recording medium, generates a recording control command to control another recording medium on which to record said recorded data, and outputs said generated recording control command to a device driver that controls recording means for recording the data onto said other recording medium.

14. The information processing method as claimed in claim 11,
wherein said disk-related information is obtained from sub-code data read from said audio-only disk-shaped recording medium.

15. The information processing method as claimed in claim 10,
wherein said file system layer further includes a second file system different from the audio-only file system, the second file system corresponding to a disk-shaped recording medium on which computer data is recorded, the virtual file system being configured to determine a second corresponding control command for the second file system and output the second corresponding control command to the second file system, the second file system being configured to allow the disk-shaped recording medium on which computer data is recorded to be reproduced by said disk receiving unit when the disk-shaped recording medium on which computer data is recorded is received in the disk receiving unit.

16. The information processing method as claimed in claim 10,
wherein said file system layer is included in operating system software that controls said information processing method.

17. An information processing apparatus for reproducing an audio-only disk-shaped recording medium, said apparatus comprising:
a disk receiving unit configured to receive at least the audio-only disk-shaped recording medium;

reproducing unit configured to reproduce an audio data signal from said audio-only disk-shaped recording medium;

storing unit configured to store data; and controlling unit configured to control reproduction of audio data from said audio-only disk-shaped recording medium on the basis of control information stored in said storing unit;

wherein said controlling unit controls the reproduction of said audio data on the basis of system controlling software stored in said storing unit, said controlling unit configured to provide:

an application layer for converting a request from application software into a predetermined command and outputting the predetermined command, wherein the predetermined command is independent of a type of file system being used; and a driver layer having a file system layer including a virtual file system and an audio-only file system, wherein the virtual file system receives the predetermined command from the application layer, determines a corresponding control command for the audio-only file system, and outputs the corresponding control command to the audio-only file system which outputs the received corresponding control command to a device driver in a device layer for said reproducing unit to read the audio data from said audio-only disk-shaped recording medium, and to control the disk receiving unit corresponding to said corresponding control command.

* * * * *